US012523535B2

(12) United States Patent
Partee (10) Patent No.: US 12,523,535 B2
(45) Date of Patent: *Jan. 13, 2026

(54) CALIBRATION PANEL (71) Applicant: Syght, Inc., Boulder, CO (US)

(72) Inventor: Charles Partee, Golden, CO (US)

(73) Assignee: SYGHT, INC., Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/739,783

(22) Filed: Jun. 11, 2024

(65) Prior Publication Data
US 2024/0328864 A1 Oct. 3, 2024

Related U.S. Application Data (63) Continuation of application No. 17/203,295, filed on Mar. 16, 2021, now Pat. No. 12,050,136.

(51) Int. Cl.
*G01J 5/53* (2022.01)
*G01J 5/00* (2022.01)
*G01J 5/02* (2022.01)
*G01J 5/04* (2006.01)
*G01J 5/48* (2022.01)
*G01J 5/80* (2022.01)
(Continued)

(52) U.S. Cl.
CPC .............. *G01J 5/53* (2022.01); *G01J 5/026* (2013.01); *G01J 5/041* (2013.01); *G01V 8/005* (2013.01); *H04N 23/23* (2023.01); *G01J 2005/0077* (2013.01); *G01J 5/48* (2013.01); *G01J 5/802* (2022.01)

(58) Field of Classification Search
CPC .... G01J 5/53; G01J 5/026; G01J 5/041; G01J 5/48; G01J 5/802; G01J 2005/0077; G01J 5/0025; G01V 8/005; G01V 8/10; H04N 5/33; H04N 17/002; G01S 13/867; G01S 13/887; G01S 17/86; G01S 3/02; G01S 17/89
USPC ............................................. 342/27, 22, 179
See application file for complete search history.

(56) References Cited

U.S. PATENT DOCUMENTS

| 4,313,069 A | 1/1982 | Szabo et al. |
| 4,661,809 A | 4/1987 | Anderson et al. |
| 5,094,544 A | 3/1992 | Ignatowicz |

(Continued)

*Primary Examiner* — John E Breene
*Assistant Examiner* — Janice M Soto
(74) *Attorney, Agent, or Firm* — Kenneth Altshuler (57) ABSTRACT The disclosed MMW wave sensing camera calibration arrangement that generally includes a millimeter wave camera that uses an energy emission calibration panel as a calibration standard. The MMW camera is positioned opposite the calibration panel in the MMW camera's field-of-view. The calibration panel is held at a constant temperature to provide a standard emission of millimeter waves that is sensed by an MMW sensor to set or otherwise calibrate the MMW camera to a baseline emissivity value corresponding to the panel. The MMW camera is linked to a microprocessor and non-transient computer memory containing a calibration routine that is configured to reset the baseline only when nothing obstructs the calibration panel's field-of-view. A visual display is linked to the MMW camera and configured to display an MMW signature of a metal object that is disposed on a person's body when the person's body is in the field-of-view, the metal object concealed by clothing worn over the person's body.

20 Claims, 5 Drawing Sheets

(51) Int. Cl.
  *G01V 8/00*   (2006.01)
  *H04N 23/23*  (2023.01)

(56) References Cited

U.S. PATENT DOCUMENTS

| | | | |
|---|---|---|---|
| 6,262,574 | B1 | 7/2001 | Cho et al. |
| 7,422,365 | B2 | 9/2008 | Chamberlain et al. |
| 10,345,631 | B1 | 7/2019 | Partee et al. |
| 2005/0110672 | A1* | 5/2005 | Cardiasmenos ... G01N 21/3581 250/330 |
| 2008/0129581 | A1* | 6/2008 | Douglass ................ G01S 13/34 342/52 |
| 2012/0026336 | A1* | 2/2012 | Koren ................... G01S 13/887 348/E7.091 |
| 2021/0364361 | A1* | 11/2021 | Ring ..................... G01J 5/0025 |

\* cited by examiner

FIG. 4

CALIBRATION PANEL

CROSS-REFERENCE TO RELATED APPLICATIONS

This continuation-in-part application which claims priority to and the benefit of U.S. patent application Ser. No. 17/203,295 entitled: CALIBRATION PANEL, filed on Mar. 16, 2021, the entire disclosure of which is hereby incorporated herein.

FIELD OF THE INVENTION

The present embodiments are directed to a calibration scheme for a heat sensitive camera that can be used in a public setting.

DESCRIPTION OF RELATED ART

Whether for protection or outright assault, people have been concealing weapons since before recorded history. Accordingly, personal examinations for security have existed just short of when concealed weapons were first conceived. With today's explosion of technology advances, the range of weapon options is expansive. From bombs and hand grenades to guns and knives, routine pat-downs can be a dangerous proposition for security personnel. Taking into account modern-day social sensitivities, the intimate touch of a pat-down is not looked upon favorably. Armed with this understanding, it should be obvious that innovations around pat-downs, such as metal detectors and x-ray systems, are being actively used to help reveal and thwart unwanted entrance of concealed weapons in secure locations without invasion of personal space. In fact, use of metal detectors and x-ray systems are ubiquitous in airports, government buildings, hospitals, etc. Though reasonably effective, these detectors need to be within a couple of feet from the subject being scanned for any hope of obtaining a signal strong enough to adequately detect a concealed weapon. In the case of x-rays, undesirable health impact has been shown. Most metal detectors and x-ray systems are large stationary pieces of equipment that a person must walk to or through.

Hand-held metal detectors (often shaped like wands with the sensor at one end and the handle at the other) in particular require close proximity to the subject of interest in order to detect items of interest. Further, only one person at a time can be scanned with these devices. One of the most utilized hand-held detector that can detect metal is a wand that operates 6 inches from the person and is marketed as a long-distance metal detector.

It is to innovations related to this subject matter that the claimed invention is generally directed.

SUMMARY OF THE INVENTION

The present embodiments are directed to a calibration panel and scheme for heat sensitive cameras.

Certain embodiments of the present invention contemplate a camera calibration arrangement comprising a heat sensing camera having a field-of-view and a heat calibration panel comprising at least one temperature that is essentially constant. The word 'having' as used herein is to be interpreted as synonymous with 'comprising'. The heat calibration panel is in the field-of-view and is disposed essentially at the right angle to a confronting panel face of the heat calibration panel. The heat calibration panel is at a stable or otherwise fixed distance away from the heat sensing camera. An object cover, such as a shirt or some other garment, is configured to cover a portion of an ambulatory heat producing object, which can be a person either walking or on a cart. The ambulatory heat producing object, and by defacto, the object cover is defined in a first location that is interposed between the heat sensing camera and the heat calibration panel and the object cover in a second location that is not in the field-of-view. A microprocessor that is configured to execute a calibration routine that uses the heat calibration panel as a calibration baseline when a predetermined condition is met. The calibration routine is never executed when the object cover is in the first location.

Yet other certain embodiments of the present invention envision a camera calibration method comprising: providing a millimeter wave (MMW) sensing camera disposed at a fixed distance from an energy emission calibration panel (panel) and opposing the panel, the panel in a field-of-view of the MMW camera. The panel being maintained at essentially a constant temperature. Triggering a calibration routine for the MMW camera that operates on a processor in communication with the MMW camera. After the triggering step, obtaining an energy emission measurement of the panel via the MMW camera only when the panel is not obstructed from the field-of-view. After the obtaining step, calibrating the MMW camera by adjusting an energy emission measurement level for the MMW camera to match the energy emission. After the adjusting step, the MMW camera acquiring a metal object signature from a metal object that is on a person's body, the metal object is between the person's body and the MMW camera, the metal object is covered under clothing that covers at least a portion of the person's body. After all of these steps, visually displaying the metal object signature on a display screen linked to the MMW camera.

While other certain embodiments of the present invention imagine an MMW sensing camera calibration arrangement is envisioned comprising an MMW camera disposed at a fixed distance from an energy emission calibration panel, the MMW camera is opposing a front face of the panel. The MMW camera further defines a field-of-view that encompasses the panel. The calibration panel is at essentially a constant temperature. The MMW camera having an MMW sensor comprising a baseline emissivity value corresponding to the panel. A microprocessor that is linked to the MMW camera and non-transient computer memory containing a calibration routine that is configured to reset the baseline only when no object obstructs the panel in the field-of-view. A visual display that is linked to the MMW camera and configured to display an MMW signature of a metal object that is disposed on a person's body when the person's body is in the field-of-view, the metal object concealed by clothing worn over the person's body.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of calibration panels and heat sensitive cameras or related sensing devices. The phrases "in one embodiment", "according to one embodiment", and the like generally mean the particular feature, structure, or characteristic following the phrase is included in at least one embodiment of the present invention, and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having" and "including" are considered open language and are synonymous with "comprising". In what follows, similar or identical structures may be identified using identical callouts.

Described herein are embodiments of a millimeter wave sensing camera calibration arrangement that generally includes a millimeter wave camera that uses an energy emission calibration panel as a calibration standard. Essentially all objects emit and/or reflect millimeter waves (MMWs), which can be sensed by specific MMW sensing camera systems. Different materials emit and/or reflect different concentrations of MMWs providing an opportunity to roughly distinguish one material from another. For example, a metal object emits a lower concentration but reflects a higher concentration of MMWs as compared with a person's body. Another characteristic of MMWs is the ability to pass through garments without any or hardly any difficulty. Accordingly, one use of an MMW camera is to see or otherwise identify a metal object under a person's clothing. This makes an MMW camera a competent concealed weapon detection apparatus for screening people going into buildings, through airports, into secure zones or areas, etc. One MMW camera set up involves putting an MMW camera on a fixed surface, table, or tripod that can screen people, suitcases, backpacks, or other like objects passing in front of it. However, like many sensing devices, the MMW sensors in the MMW cameras tend to drift, meaning the sensed intensity of MMWs corresponding to a particular MMW baseline tends to drift away from the baseline. One solution is to mount a calibration panel on a wall or on a stand opposing the MMW camera. Because a MMW camera senses emissivity, which is influenced by temperature, the calibration panel is envisioned to be held at a constant temperature thereby emitting a known intensity of MMWs. Hence, a passive calibration arrangement envisions a calibration panel mounted on a wall or set up at a far enough distance away from the MMW camera for people to comfortably walk between. In this way, a person unaware of an MMW camera and panel system, is passively screened for concealed weapons by simply walking between the MMW camera and the calibration panel. The MMW camera re-calibrates its baseline via the panel from time to time when no one is in front of the panel. Other embodiments of the present invention envision using the panel arrangement to also calibrate an infrared/heat sensing camera. The below figures illustrate some of these concepts by way of examples in the form of embodiments.

Figure 1:
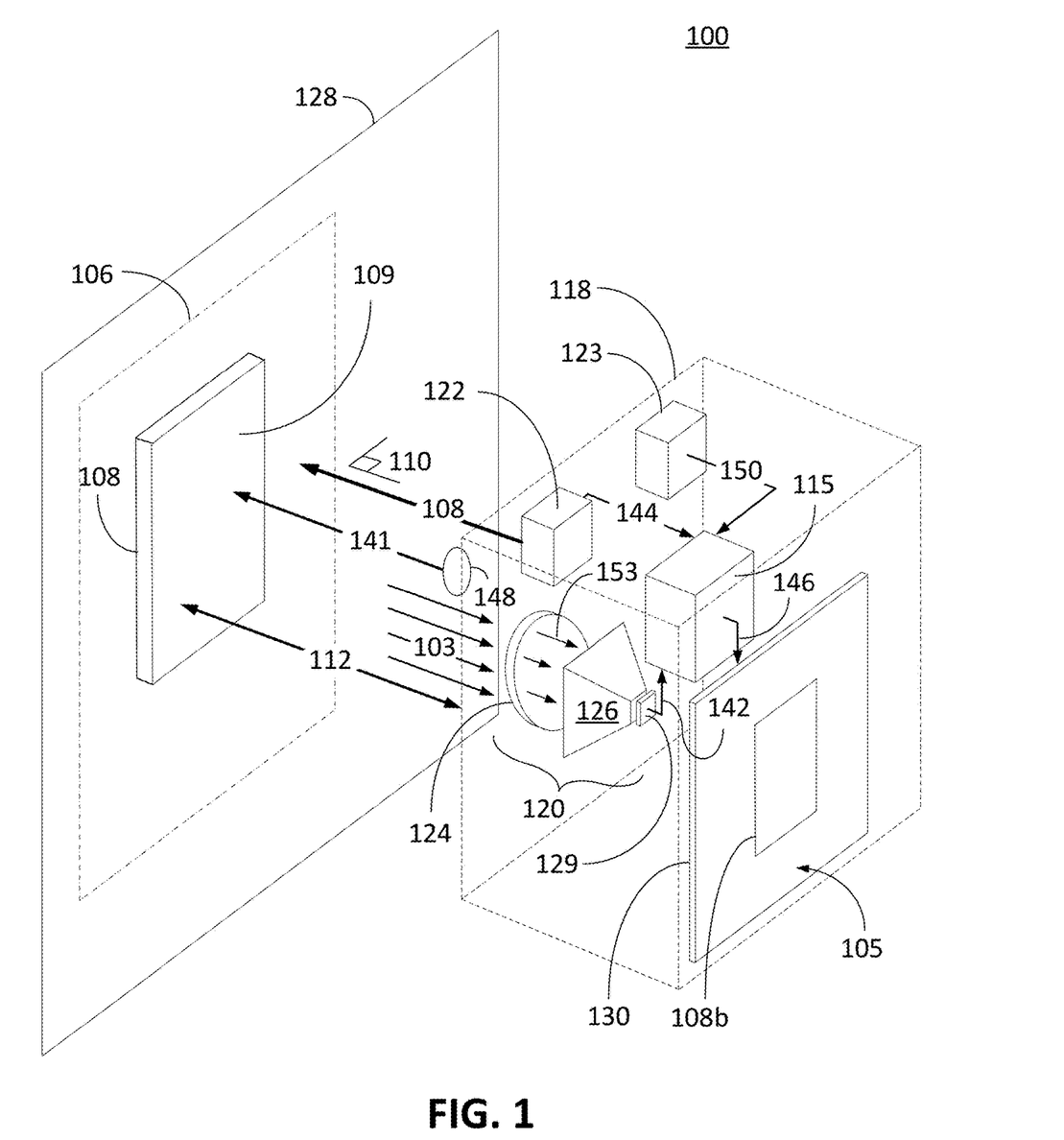
FIG. 1 is a line drawing of a single heat sensing camera and thermal panel calibration arrangement consistent with embodiments of the present invention.

FIG. 1 is a line drawing of a single heat sensing camera and thermal panel calibration arrangement consistent with embodiments of the present invention. As shown here, the heat-sensing camera is a millimeter wavelength (MMW) camera 120 pointing in the direction of a thermal calibration panel 108. The MMW camera 120 distinguishes over other types of cameras in that an MMW camera detects millimeter (mm) waves emitted at frequencies between 30-300 GHz. Detecting mm waves (MMWs) 103 makes the MMW camera 120 especially good at seeing metallic objects under garments, such as concealed weapons on a person or in a bag. The MMW camera 120 can be coupled with an optical camera 122, which in the present embodiment is arranged to point in the same field-of-view 106 as the MMW camera 120. Hence, when an MMW image is taken it can be compared with the optical camera image (e.g., the MMW image can be framed with, overlaid on, superimposed with, framed with, or otherwise related to the MMW image via some other kind of comparative technique). In certain configurations, a plurality of MMW images are stitched together to define an MMW field-of-view 106 and then compared with an optical camera image, which can accommodate a situation when the MMW field-of-view 106 is smaller than the optical camera field-of-view. As should be appreciated, an overlaid MMW image (or stitched together MMW images) on a corresponding optical image may improve showing a metallic object superimposed over a subject of interest, such as a person potentially carrying a concealed weapon or a weapon in a bag. In this way, an end-user (such as TSA or police) can easily evaluate the threat of a concealed weapon in a person's possession.

In this embodiment, the fundamental layout of the MMW camera system 120 is an antenna 124 positioned in front of an electromagnetic horn 126 and the MMW detector 129. Different configurations can accomplish the goal of collecting MMW waves 103, e.g., the horn 126 can function as the antenna 124, etc. The MMW camera system 120 detects electromagnetic waves (EMW) in the millimeter (mm) frequency range from between 30 GHz to 300 GHz. Based on principles of blackbody radiation, all objects above absolute zero radiate (or emit) millimeter waves (MMWs) more or less uniformly in all directions. Objects also reflect ambient MMWs in the environment (from sources such as the sun, interior lighting, or sources that intentionally transmit MMWs) as well as self-generated emission of MMWs due to blackbody radiation. MMWs are particularly well suited for identifying concealed metal weapons (or other metallic objects) through clothing, and the like, because MMWs are long enough to penetrate clothing (compared to visible light, for instance) but short enough to reflect off or emit from metal.

As further shown in FIG. 1, the MMW antenna 124 collects MMWs 103 (or more specifically the MMW electromagnetic energy) coming from a particular field-of-view 106 and directs the collected MMW energy 103 to the MMW detector 129 via the electromagnetic horn 126. As previously mentioned, a number of different antenna configurations are envisioned within the scope and spirit of the present invention including a Cassegrain antenna, which includes a parabolic antenna having a feed antenna mounted behind an aperture formed in the center of the surface of a concave main parabolic reflector dish. The feed antenna is in front of the main dish to direct radiation reflected from the dish back through the spatial light modulator and ultimately to the MMW detector 129 via the electromagnetic horn 126. The electromagnetic horn 126, which can made from a suitable electrically conductive material, effectively funnels the collected MMW energy 153 to the MMW detector 129. The MMW detector 129 can be a single pixel detector or multi-pixel detector that converts the detected MMW energy 103 to an output voltage signal. Certain commercial embodiments of an MMW detector are produced by Millitech, Ommic, Faran Technology, QuinStar Technology, Inc., or Hughes Research Laboratories, LLC., just to name a few manufacturers.

The MMW detector output voltage signal in the field of view 106 is electrically transmitted from the MMW detector 129 to the computing system 116 via pathway 142, which can be an electrical wire line for example. The computing system 115 conditions the MMW detector output voltage signal into a metallic enhanced MMW digital image 105 (whereby metallic objects are enhanced) that is sent over pathway 146 to be displayed on the display screen or monitor 130. Pathway 146 can be a wireline connection between the computing system 115 and the display device 130, for example. Here, an image of the panel 108b is displayed on the display screen. In operation, any metallic enhanced MMW digital image 105 is displayed within the perimeter display screen 130. The MMW digital image 105 displays the presence/image of a metallic object. Though certain embodiments envision the MMW camera 120 collecting MMWs 103 passively from ambient radiation reflected and emitted from the subject of interest, other embodiments envision an active MMW radiation source 148 emitting MMW radiation 141 that actively reflect MMWs from the subject of interest. Certain embodiments envision the MMW radiation source 148 emitting a wavelength of between 30-300 GHz with some embodiments envision the MMW radiation source 148 emitting a wavelength centered at 94 GHz.

Certain embodiments further envision the optical camera 122 also pointing at the or otherwise in line with the MMW field-of-view 106 and included in a common camera unit 118. In the present embodiment, the optical camera 122 is connected to the computing system 115 by way of a wireline (or optionally a wireless) link 144. In this way, the computing system 115 can transmit an output image to the display screen 130, which can include an overlay of an MMW image and optical image.

As depicted, the MMW camera 120 is pointing towards the thermal calibration panel 108 (or simply "panel") and is separated from the panel 108 by a stable distance 112. By stable distance 112 it is meant that the distance between the MMW camera 120 and the panel 108 is fixed and does not change during operation. That is the MMW camera 120 and the panel 108 are each in a fixed location during operation. Certain embodiments envision the distance 112 being between 4 feet and 50 feet, however other embodiments envision the distance being less than 20 feet. Hence, the MMW camera 120 or camera unit 118 can be mounted on a table or a stand (e.g., tripod) and positioned at the fixed distance in front of the panel 108. The panel 108 is configured to be maintained at a constant and known temperature. Accordingly, certain configurations envision an embedded electrical heating mesh in the panel 108, a hollow region in the panel 108 filled with water, gas, or some other kind of fluid (possibly circulated to reduce thermal gradients) that is electrically heated (or cooled) and held at a constant temperature, or some other configuration understood by those skilled in the art. The panel 108 can be metal, composite, polymer based, or some other suitable material within the scope and spirit of the present invention. Certain embodiments envision the panel 108 being held at a temperature between 70° F.-110° F., at or about the temperature of a human, just to name a couple of examples. The panel 108 can be mounted on a wall 128, as shown, or optionally on its own stand. In this embodiment, the panel 108 faces the MMW camera 120 and the optical camera 122 that are embodied by the common camera unit 118. Further in this embodiment, the MMW camera 120 is at a right angle 110 to a confronting panel face 109 of the panel 108. In some embodiments, the confronting panel face 109 is a flat surface that is the largest surface of the panel 108, and in some circumstances the only surface, that the MMW camera 120 "sees" when there is nothing but air between the panel 108 and the MMW camera 120.

The MMW camera 120 uses the panel 108 as the thermal calibration surface to calibrate against. More specifically, any drift or offset in the output from the MMW camera 120 can be readjusted, or 'zeroed out', in the computing system 115 (or elsewhere, e.g., the MMW detector 129) based on the known temperature of the panel 108. Certain other embodiments envision an independent heat sensitive infrared (IR) camera 123 pointing at the panel 108 to collect heat information. The IR camera 123 can be used in conjunction with the MMW camera 120 to calibrate the MMW camera 120. Optionally, the IR camera 123 can be independently calibrated against the panel 108 in the event the IR camera 123 drifts. Certain embodiments envision the IR camera 123 used to measure the temperature of a person for purposes of identifying a person with an above normal temperature, which could be indicative of an illness. The IR camera 123 is connected to the computing system 115 via the connecting link 150. In the present embodiment, the MMW camera 120, the optical camera 122 and the IR camera 123 all receive EM waves at a right angle 110 from the panel 108.

Figure 2A:
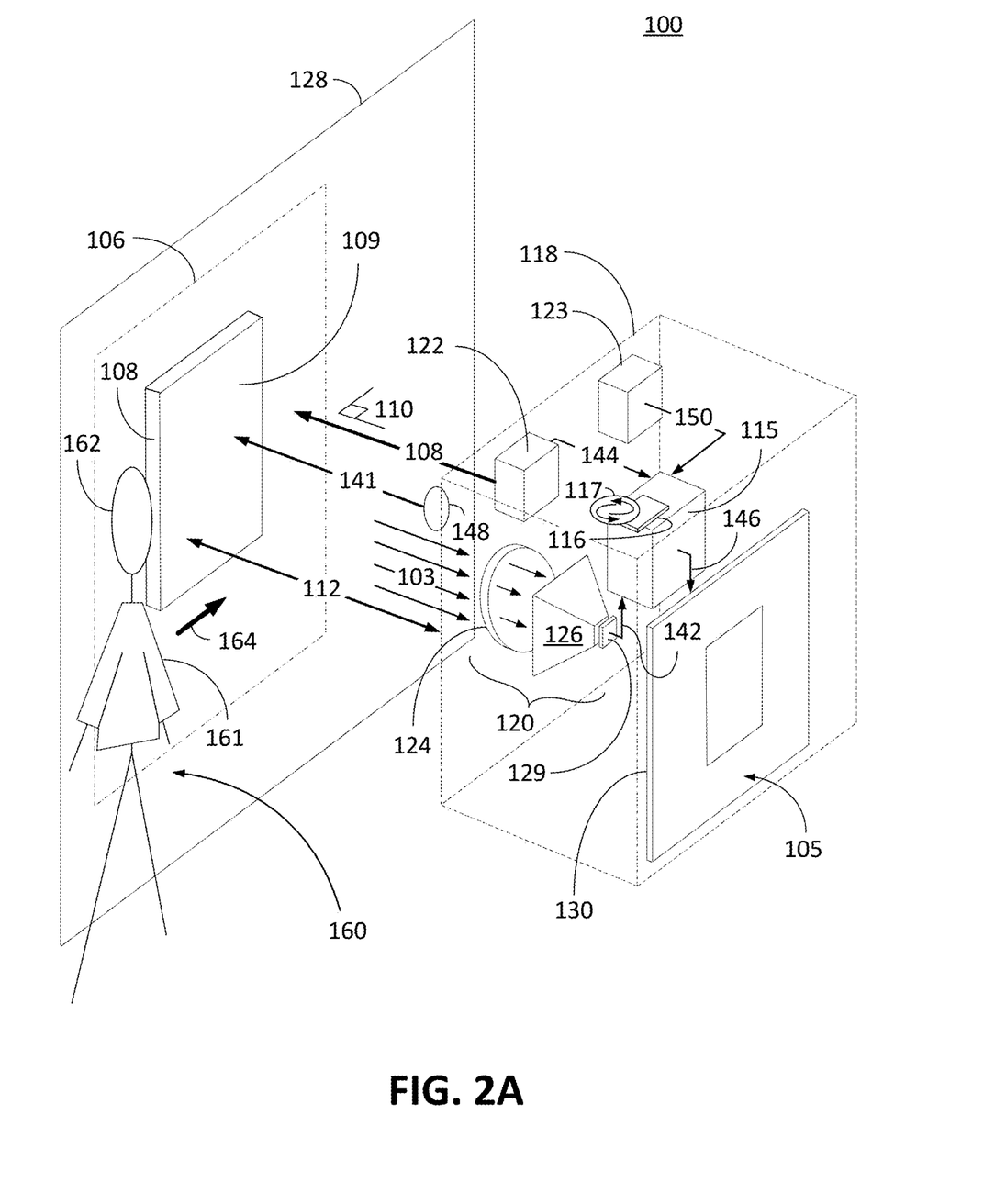
FIGS. 2A and 2B illustratively depict examining a person as they pass between the MMW camera and the panel consistent with embodiments of the present invention.
Figure 2B:
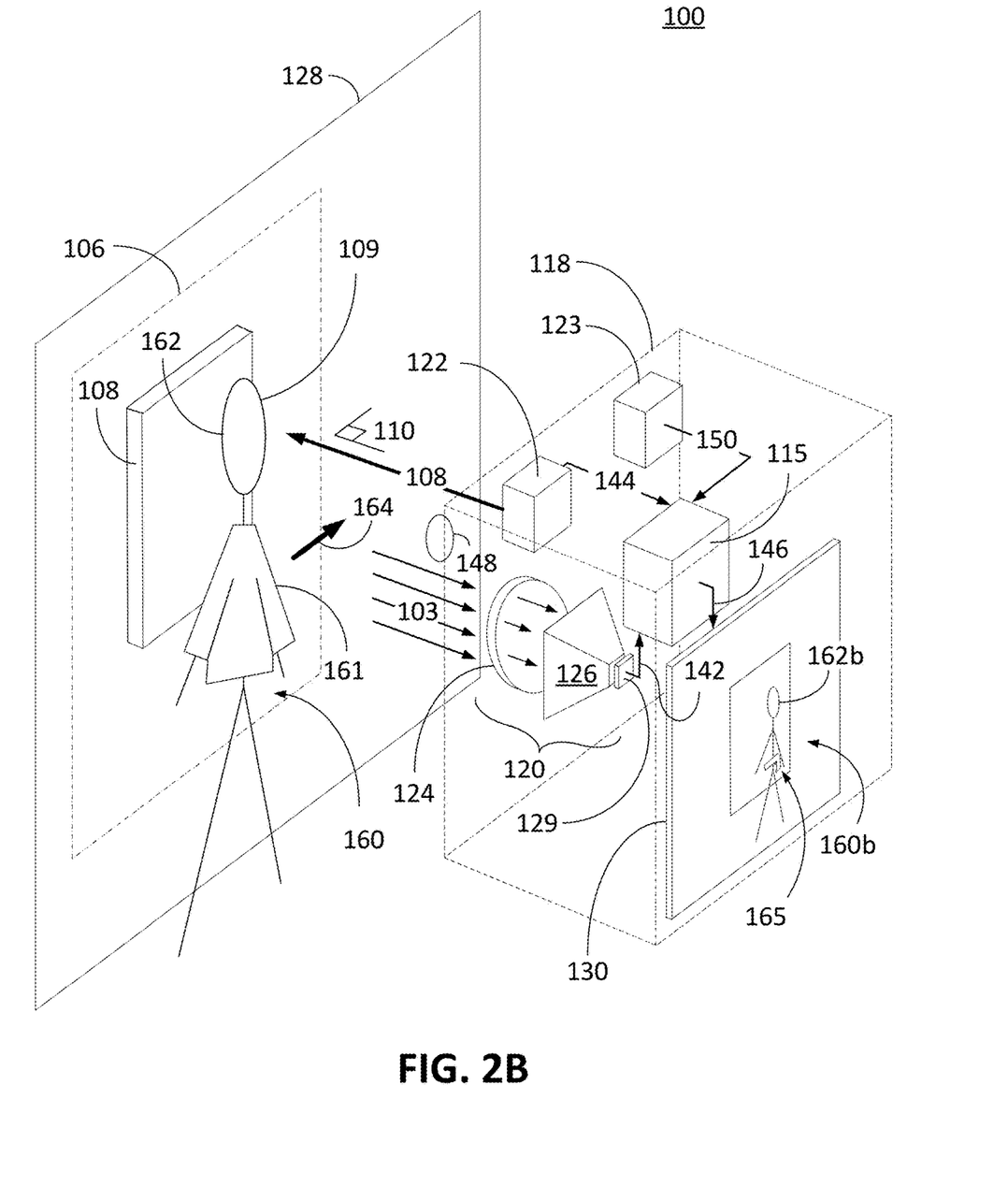

FIGS. 2A and 2B illustratively depict examining a person 160 as they pass between the MMW camera 120 and the panel 108 consistent with embodiments of the present invention. In this particular embodiment, the camera unit 118 is arranged consistently with the camera unit of FIG. 1. As shown in FIG. 2A, the person 160 is about to walk between the camera unit 118 and the panel 108, as indicated by the arrow 164. Though the present figure presents a person 160 on their way to walk in front of the camera unit 118, the person 160 is a subset of a more generic ambulatory heat-producing object 160. In other words, an ambulatory heat-producing object 160 can be an animal (such as a dog), or a heat producing machine that can move or otherwise ambulate (such as a motorized cart or vehicle carrying one or more people). In the broadest sense, the arrangement 100 can be used with any object whether living or otherwise that passes between the panel 108 and the camera unit 118. Certain embodiments contemplate the ambulatory heat-producing object 160 comprising a cover 161 that at least partially obscures the heat-producing object 160. In the present embodiment, the ambulatory heat-producing object is a person 160 and the object cover 161 is the person's clothing (i.e., shirt, pants, jacket, etc.). Clothing can be a weave garment, plastic or leather, just to name several well-known garment examples. The point being, a concealed weapon is indeed concealed under clothing, a bag, a suitcase, or some other object cover.

With continued respect to the present arrangement 100, in certain embodiments, the MMW camera 120 and/or the IR camera 123 are calibrated against the panel 108 before a person 160 passes between the panel 108 and the camera unit 118. This can be accomplished with the calibration routine 117 running on the computing system 115. The computing system 115 comprising the necessary memory, microprocessors, interfaces, input/output ports and other components to execute or otherwise run the calibration routine in addition to running other software programs like image conditioning and overlay software programs that are optionally stored in the computing system's local memory (not shown). The calibration routine 117 uses the panel 108 as a calibration baseline and is executed when a pre-determine condition is met. Examples of a predetermined condition can include two conditions: A) when there is no object, or anything else for that matter, obscuring a clear view of the panel 108 by the MMW camera 120 and/or the IR camera 123, and B) when a secondary calibration condition is met. In other words, condition 'B' is never executed when the object cover 121 is interposed between the panel and the camera unit 118 (i.e., condition 'A' must be met). The secondary condition can include: after a predetermined amount of time from a last calibration (e.g., after 5 or 10 minutes from the last calibration), on a predetermined schedule (e.g., at the top of every hour), after a person/object 160 crosses the panel 108, after a certain number of people/objects across the panel 108, manually, randomly activated, etc. The reason conditions 'A' and 'B' must both be met is that if the panel 108 is obscured, partially obscured, has changing obscurity, then a clear calibration cannot be accomplished. Certain embodiments envision overcoming this obstacle by calibrating a small portion of the panel 108 when nothing is obscuring that small portion of the panel 108. Accordingly, in this scenario the spirit of conditions 'A' and 'B' still hold true. One last option is that the MMW camera 120 and/or the IR camera 123 dynamically find a calibration spot around the subject 160 partially obscuring the panel 108.

FIG. 2B depicts the person 160 at least partially covered by clothing 161 passing in front of the panel 108, as shown by the arrow 164. In this embodiment, the MMW camera 120 collects MMW 103 emitted or reflected from the person 160 (and translates into an temperature image), the optical camera 122 snaps an optical image of the person 160 and the IR camera 123 collects heat information from the persons head 162 (possibly in an IR image). At least one if not all of the images (optical, MMW and IR) can be combined and displayed 105 on the display screen 130. Here, the temperature from the person's head 162 is visually shown in a display image of the head 162b on the display 130 (but could also be posted as a maximum sensed temperature value), the optical image of the person 160b is shown on the display 130, and metallic objects 165 overlay on the person 160b. In this particular example, the display 130 shows a concealed weapon 165 under the garment 161.

Figure 3:
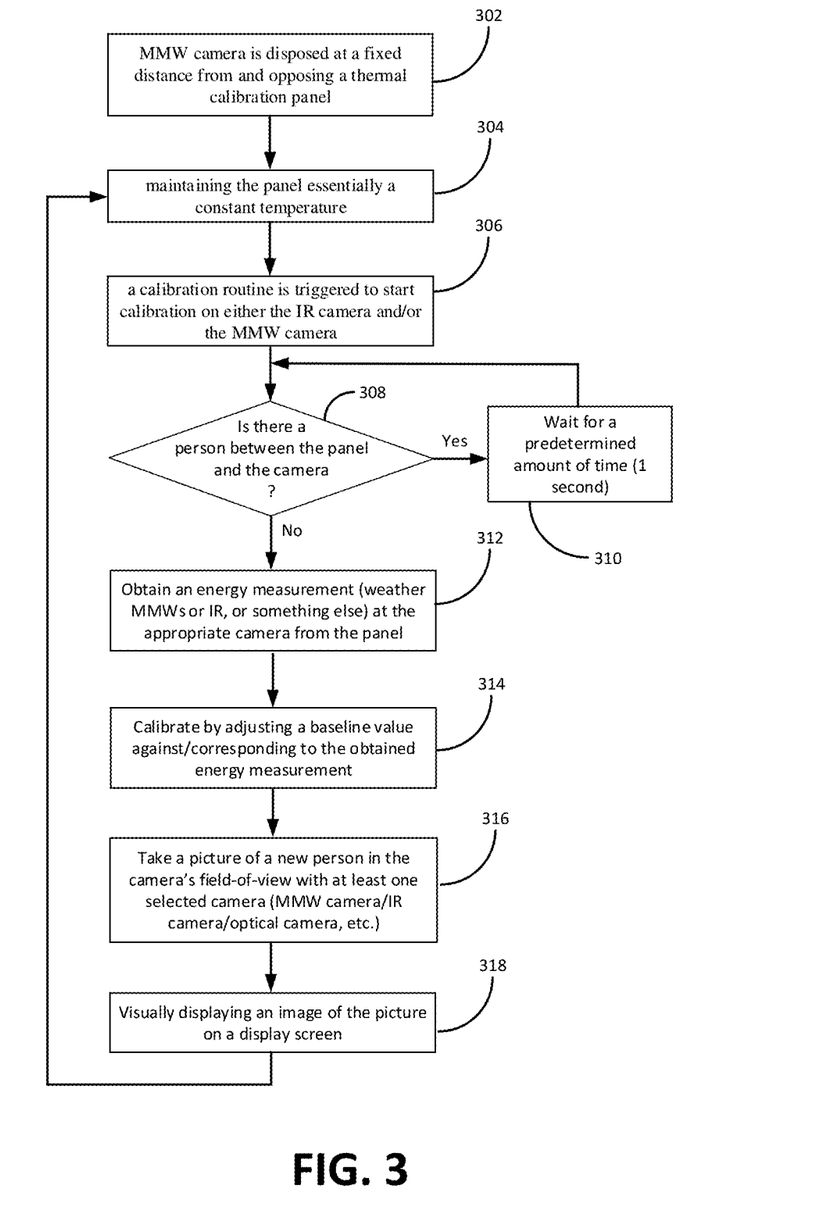
FIG. 3 is a block diagram laying out the calibration scheme for the heat camera and panel arrangement of FIGS. 2A and 2B consistent with embodiments of the present invention.

FIG. 3 is a block diagram laying out the calibration scheme for the heat camera and panel arrangement of FIGS. 2A and 2B consistent with embodiments of the present invention. As shown in step 302, an MMW camera 120 is disposed at a fixed distance 112 (e.g., 5-20 ft. apart) from the thermal calibration panel 108 and as further shown is opposing the panel 108. The term opposing herein is defined as an element that is directly in front of another element. In this case, the large flat panel face 109 is essentially opposing the MMW camera 120 (an example of "essentially" can be +/−2 degrees). That is, in this example, the large flat panel face 109 resides in a geometric plane and the MMW camera 120 is spaced away 112 from the geometric plane at essentially 90° (at a right angle 110). The panel 108 is in the MMW camera's field-of-view 106. The MMW camera's field-of-view 106 is at least a single area on the wall 128 or panel 108 that can be detected by the MMW camera 120. Alternatively, the field-of-view 106 is a matrix of a plurality of smaller areas detected by the MMW camera 120 that are stitched together to make a larger area, for example, an area that is displayable on the display screen 130. This can be accomplished by a plurality of detectors, or a motorized detector that can move slightly to cover (i.e., traverse across) the field-of-view area 106 to collect enough MMW image areas to reconstruct a full field-of-view 106.

Step 304 is a step for maintaining the panel 108 at essentially a constant temperature. By essentially, it is meant that the temperature is held at a target temperature within some defined tolerance such as +/−1 degree, or +/−a fraction of a degree, for example. The temperature of the panel 108 is detectable by an IR camera 123 (i.e., the IR waves transmitted from the panel 108), the optical camera 122 can take (acquire) an optical image of the panel 108 the visual panel, and the MMW camera 120 can collect/detect MMWs 103 emitted and/or reflected by the panel 108. The MMWs 103 emitted and/or reflected by the panel 108 are affected by the temperature. Accordingly, the panel 108 can serve as an energy emission calibration panel 108 specifically configured for calibrating the MMW camera 120. Certain embodiments envision the panel 108 being as thin as a quarter-inch thick (or thinner) to a thickness of up to 6 inches. Other embodiments have no specific thickness limitation, so long as the panel 108 serves its functionality within the scope and spirit of the present invention. The panel face 109 is preferably flat, however some embodiments envision a textured or slightly wavy surface. The MMW camera 120 is a fixed distance 112 from the surface of the large flat panel face 109, which in certain embodiments serves as an energy emission calibration panel 108.

As shown in step 306, a calibration routine 117 is triggered to start calibration on either the IR camera 123 and/or the MMW camera 120. The calibration routine 117 can be retained/contained in non-transient computer memory, such as a Solid State Drive, or some other kind of solid-state memory, such as a micro SD card or SDXS card, for example, that is operably connected to the microprocessor 116. The calibration routine 117 is executed or otherwise operates on a microprocessor 116 that is either in the MMW camera 120 or in communication/linked to the MMW camera 120. Certain embodiments envision the microprocessor 116 controlling the functionality of the MMW camera 120, while other embodiments envision the microprocessor 116 cooperating with a microprocessor (not shown) on board the MMW camera 120. The microprocessor 116 can further be in cooperation with at least one of the IR camera 123, the optical camera 122, the display 130, the computing device 115, and/or other peripherals or computer responsive elements in the common camera unit 118.

The triggering step 306 can be initiated based on a number of optional factors as defined by the routine 117. In one embodiment, the triggering step 306 occurs as a result of a person 160 being scanned by at least the MMW camera 120 and then stepping out of the camera's field-of-view 106 before another person steps in the camera's field-of-view 106. More specifically, when a first person 160 moves in front of the MMW camera 120, the MMW camera 120 obtains an energy emission measurement in the form of collecting MMWs 103 of everything in the MMW camera's field-of-view 106 including the first person 160. The intensity of MMWs 103 is greater over metallic objects wherein clothing does not inhibit the emission of MMWs 103. Hence, as shown in FIG. 2B, the display screen 130 shows a metallic gun-shaped object 165 hidden under the persons clothing 161. As also shown in FIG. 2B, the MMW camera 120 is essentially opposing the person 160 (i.e., the person 160 is interposed between the MMW camera 120 and the panel 108, or otherwise in the field-of-view 106) in order to formulate the MMW image of the person 160b on the display 130. After the first person 160 is scanned and then stepped out of the field-of-view 106, the calibration routine 117 can instruct the MMW camera 120 to obtain at least one energy emission measurement of the unobstructed panel 108 (e.g., measure the intensity of the MMWs emitted from the panel 106), step 312.

Optional calibration routines 117 can be triggered or otherwise initiated a) after a predetermined amount of time from the previous calibration measurement, such as every half an hour, b) at specific times of the day, such as first thing in the morning at noon and at the end of the day, for example, c) after a certain amount of measurements taken, such as after every five people measured, d) if the room temperature or lighting significantly changes, e) manually, either controlled remotely or locally, f) input from a nearby panel and camera system that identifies a significant drift during calibration, etc.

In some embodiments after a calibration routine 117 is started, step 306, step 312 of obtaining the energy emission measurement from the panel 108 is not done until the person 160 or some object is not obstructing the panel 108, shown in the question block step 308. If there is nothing obstructing the panel 108 from the MMW camera 120 in the field-of-view, then continue on to step 312 otherwise wait until the MMW camera 120 has a clear and unobstructed view of the panel 108, step 310. One embodiment of step 310 is to wait for a predetermined of time to pass and then recheck (return to step 308), such as after a second or two.

With more detail to step 312, certain embodiments contemplate the calibration routine 117 instructs the MMW camera 120 to obtain at least one energy emission measurement from the panel 108 only when the panel 108 is not obstructed from the field-of-view 106. In other words, despite which calibration scheme is used, there must be no person 160 or some other ambulatory object interposed between the panel 108 and the MMW camera 120 because the MMW camera 120 needs to be able to fully see the panel 108 in order to properly calibrate. However, certain other embodiments envision the panel 108 divided into quadrants or smaller areas by which the MMW camera 120 can calibrate against a small identifiable area on the panel 108 instead of the entire panel 108. For example, if the panel 108 was divided into 16 rectangles or partitions (either mapped by the MMW camera 120 or processor 116, or physically distinguishable sections on the panel 108), and if at least one of the rectangles is not obstructed, then it is possible to calibrate against at least one of the unobstructed rectangle partitions.

Another embodiment of the panel 108 is a panel that is divided into a plurality of regions/sections (at least two regions/sections), such as rectangles, wherein each of the regions/sections is held at a different temperature. The sections held at a different temperature will allow the MMW camera 120 (or IR camera 123) to calibrate the voltage gain (slope) as well as the offset. Optionally, the panel 108 can have at least two regions/sections made of different materials that each have a different emissivity, which can assist in various calibration routines for the MMW camera 120 including slope and offset.

Once an energy emission measurement is taken from the panel 108, a baseline emission value is readjusted in the MMW camera 120, step 314. The baseline emission value (the baseline of the emission energy collected from the panel 108) corresponds or is otherwise matched to the energy emission of the panel 108 held at the constant temperature. In other words, the MMW camera 120 is calibrated against the calibration panel 108. This calibration scheme 117 corrects for drifting measurements taken by the MMW camera 120 to provide confidence that data taken by the MMW camera 120 is accurate.

It should be appreciated that steps 302-314 can be equally applied to the IR camera 123 whereby instead of MMWs 103 collected or otherwise sensed by the MMW detector/sensor 129, infrared energy is sensed by the IR camera 123. The IR camera 123 can be further used to take temperature measurements of a person's head 162, which if above or below normal can be an indication of a sick person. Temperature data can be presented on the display 130, or an alarm can be triggered if a person's temperature is above or below a margin of tolerance (e.g., a fever of above 100° F.), just to name several reporting examples. For obvious reasons, the IR camera 123 needs to be accurate to be confident in temperature measurements taken of a person's head 162. Hence, the IR camera 123 is well adapted for the calibration scheme using the temperature controlled panel 108. Images of data taken with the IR camera 123 can be superimposed over the images of the MMW camera 120 on the display screen 130, or other capable display device/s. An optical image of the field-of-view 106 superimposed over the MMW camera image and/or the IR camera image can further enhance an end users understanding of that which is displayed. A skilled artisan will readily appreciate that all data can be stored digitally and retrieved for later use or transmitted to other computer systems in a multitude of ways known to those skilled in the art.

With reference back to the MMW camera 120 and with reference to FIG. 2B, after the calibration step 314, the MMW camera 120 is available for taking a new image of a second person passing in the MMW camera field-of-view 106, step 316. In this way, MMWs 103 emitted and/or reflected from the person 160, who in this example is wearing a garment 161, is collected by the camera 120. The data is then sent to the computing system 115. The display 130 illustratively depicts an image of the person 160b (along with the image of the person's head 162b) and an image of a gun shaped metallic object 165 on the person's body 160, step 318. The gun shaped metallic object 165 is obscured or otherwise visibly concealed by the persons garment 161 when viewed by an onlooker or optical camera, for example. However, the MMW's 103 easily penetrate through the garment 161 and are therefore picked up by the MMW detector 129 to display an image of the gun shaped object 165 on the display screen 130. Certain other algorithms that can run on the computing system 115 include shape recognition algorithms to identify concealed weapons such as guns, particular kinds of guns, knives, bombs, or other kinds of metallic weaponry that can be concealed. Obviously, these alternate algorithms can be stored to nonvolatile memory (not shown) cooperating with the computing system 115. Some embodiments envision if a weapon is discovered on the person 160, an alarm will be set off (whether visually on the display 130, or a light, a siren, by way of an electronic notification sent to an authority or end user, etc., or some combination thereof).

Figure 4:
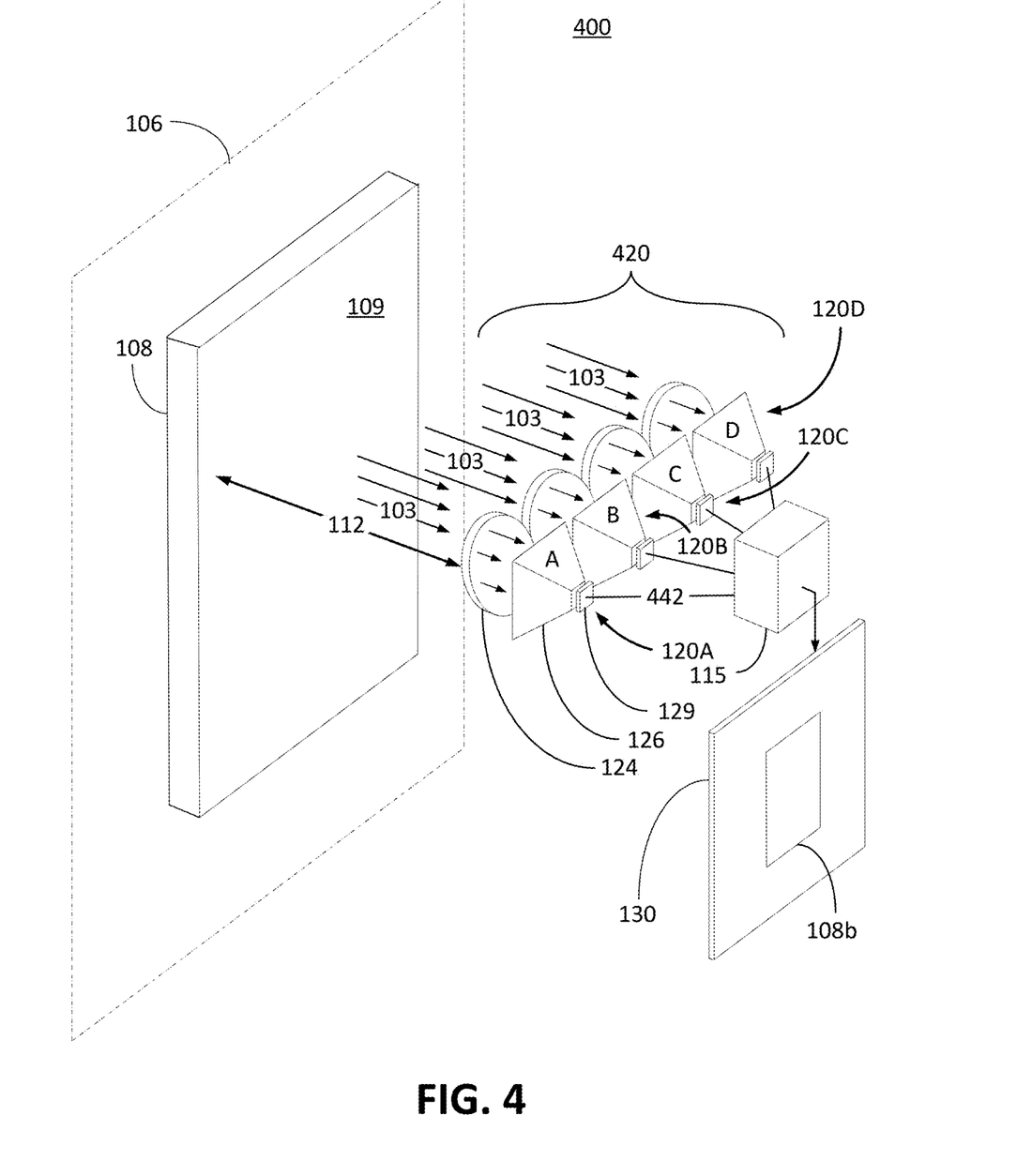
FIG. 4 is a line drawing of yet another calibration arrangement of the present invention with a plurality of MMW cameras consistent with embodiments of the present invention.

FIG. 4 is a line drawing of yet another calibration arrangement 400 of the present invention with a plurality of MMW cameras consistent with embodiments of the present invention. As shown, an array of MMW cameras 420 point towards the panel 108. The MMW cameras 420 are essentially opposing the large panel face 109 at a fixed distance 112, which in certain embodiments is 5-20 ft. The MMW cameras 120A-120D collectively comprise the field-of-view 106 either by virtue of being spread apart or by slightly tipped in a different region of the field-of-view 106. In this way, an MMW image displayed on the display screen 130 can be constructed, assembled or otherwise stitched together from each of the individual MMW cameras 120A-120D. Certain embodiments envision a matrix of MMW cameras instead of a single array of MMW cameras 420. For example, one or more similar arrays of MMW cameras disposed below the depicted array of MMW cameras 420, such as a matrix of 20 MMW cameras (5 stacked arrays) that collectively can make up the field-of-view 106. Each of the MMW cameras 120A-120D are linked to the computing system 115 by way of a wireline 442. As in the other figures, the computing system 115 feeds information into the display screen 130. An image of the panel 108b, which corresponds to the panel 108, is displayed on the display screen 130. For purposes of simplicity, a housing is not shown containing the array of MMW cameras 120A-120D, however in reality one or more housings can be employed. It should be appreciated that other cameras, such as the IR camera 123 and optical camera 122 can be used in the present arrangement 400 in a manner described in conjunction with the previous figures. It should also be appreciated that the algorithms described in conjunction with the previous figures can be equally applied to the present embodiment.

With the present description in mind, below are some examples of certain embodiments illustratively complementing some of the methods and apparatus embodiments to aid the reader. The elements called out below are examples provided to assist in the understanding of the present invention and should not be considered limiting.

In that light, certain embodiment contemplate a camera calibration arrangement 100 comprising a heat sensing camera 120 having a field-of-view 106 and a heat calibration panel 108 comprising at least one temperature that is essentially constant. The word 'having' as used herein is to be interpreted as synonymous with 'comprising'. The heat calibration panel 108 is in the field-of-view 106 and is disposed essentially at the right angle 110 to a confronting panel face 109 of the heat calibration panel 108. The heat calibration panel 108 is at a stable or otherwise fixed distance 112 away from the heat sensing camera 120. An object cover 161, such as a shirt or some other garment, is configured to cover a portion of an ambulatory heat producing object 160, which can be a person 160 either walking or on a cart. The ambulatory heat producing object 160, and by defacto, the object cover 161 is defined in a first location of FIG. 2A that is interposed between the heat sensing camera 120 and the heat calibration panel 108 and the object cover 161 in a second location of FIG. 2B that is not in the field-of-view 106. A microprocessor 116 that is configured to execute a calibration routine 117 that uses the heat calibration panel 108 as a calibration baseline when a predetermined condition is met. The calibration routine 117 is never executed when the object cover 161 is in the first location.

The camera calibration arrangement 100 further contemplating wherein the stable distance 112 is at least 5 feet away from the camera 120.

The camera calibration arrangement 100 further envisioning wherein the heat calibration panel 108 is mounted on a wall 128.

The camera calibration arrangement 100 further pondering wherein the distance 112 does not change.

The camera calibration arrangement 100 further comprising a heat image routine 117 that is configured to obtain a heat signature of the ambulatory heat producing object 160 via the heat sensing camera 120.

The camera calibration arrangement 100 further imagining wherein the heat calibration panel 108 comprising a surface area 109 viewable to the heat sensing camera 120 that is greater than 2 feet squared.

The camera calibration arrangement 100 further considering wherein the heat sensing camera 120 is a millimeter wavelength camera.

The camera calibration arrangement 100 further envisioning wherein the heat sensing camera 120 senses infrared and/or emissivity.

The camera calibration arrangement 100 further pondering wherein the predetermined condition is met after the object cover 161 crosses between the heat sensing camera 120 and the heat calibration panel 108, after a predetermined amount of time, during a predetermined time schedule, manually activated either remotely or locally, or randomly activated.

The camera calibration arrangement 100 further contemplating wherein the heat sensing camera 120 comprises the microprocessor 116.

The camera calibration arrangement 100 further imagining wherein the heat sensing camera 120 is configured to distinguish at least one metallic 165 behind the object cover 161. This can further be where the metallic object 165 is a weapon.

The camera calibration arrangement 100 further envisioning wherein the ambulatory heat producing object 160 is a human being.

Yet another embodiment of the present invention contemplates camera calibration method comprising: providing an MMW camera 120 disposed at a fixed distance 112 from an energy emission calibration panel (panel) 108 and opposing the panel 108, the panel 108 in a field-of-view 106 of the MMW camera 120. The panel 108 being maintained at essentially a constant temperature. Triggering a calibration routine for the MMW camera 120 that operates on a processor in communication with the MMW camera 120. After the triggering step, obtaining an energy emission measurement of the panel 108 via the MMW camera 120 only when the panel 108 is not obstructed from the field-of-view 106. After the obtaining step, calibrating the MMW camera 120 by adjusting an energy emission measurement level for the MMW camera 120 to match the energy emission. After the adjusting step, the MMW camera 120 acquiring a metal object signature from a metal object that is on a person's body 160, the metal object is between the person's body 160 and the MMW camera 120, the metal object is covered under clothing 161 that covers at least a portion of the person's body 160. After all of these steps, visually displaying the metal object signature on a display screen linked to the MMW camera 120.

The camera calibration method embodiment further imagining wherein the fixed distance is between 5 feet and 20 feet.

The camera calibration method embodiment further considering wherein the panel 108 is mounted on a wall and the MMW camera 120 is affixed to a stand. The stand being a table or a tripod or something like that.

The camera calibration method embodiment further pondering wherein the obtaining step happens between when a second person's body is interposed between the MMW camera 120 and the panel 108 and the person's body is interposed between the MMW camera and the panel 108, the triggering step occurs as a result of the person's body passing in between the MMW camera 120 and the panel 108. This can further be wherein the triggering step also occurs as a result of the second person's body passing between the MMW camera 120 the panel 108. Optionally, this can further be wherein the triggering step occurs after a predetermined amount of time has lapsed. Yet in another option, the method can further comprise an infrared (IR) camera 123 linked with the MMW camera 120; the IR camera 123 collecting infrared radiation from the panel 108; calibrating the IR camera 123 from the infrared radiation; collecting a heat signature of at least a portion of the person's body 160 when in the field-of-view 106, the IR camera 123 sharing an overlapping IR field-of-view with the field-of-view 106. Still in another option, the method can further comprise an optical camera 122 linked with the MMW camera 120, the MMW camera 120 collecting and optical image of the person's body 160 and superimposing an image of the person's body 160 with the metal object signature on a display screen.

In yet another embodiment of the present invention, an MMW wave sensing camera calibration arrangement 100 is envisioned comprising an MMW camera 120 disposed at a fixed distance from an energy emission calibration panel (panel) 108, the MMW camera 120 is opposing a front face 109 of the panel 108. The MMW camera 120 further defines a field-of-view 106 that encompasses the panel 108. The calibration panel 108 is at essentially a constant temperature. The MMW camera 120 having an MMW sensor 129 comprising a baseline emissivity value corresponding to the panel 108. A microprocessor 116 that is linked to the MMW camera 120 and non-transient computer memory containing a calibration routine that is configured to reset the baseline only when no object obstructs the panel 108 in the field-of-view 106. A visual display 130 that is linked to the MMW camera 120 and configured to display an MMW signature of a metal object that is disposed on a person's body 160 when the person's body 160 is in the field-of-view 106, the metal object concealed by clothing 161 worn over the person's body 160.

Still another embodiment of the present invention contemplates a calibration arrangement 400 comprising: an array of MMW sensing cameras 420 having a collective field-of-view 106, the array is essentially at a right angle 110 to a plane defined by a heat calibration panel 108. The panel 108 comprising at least one temperature that is essentially constant wherein the heat calibration panel 108 is in the field-of-view 106. The heat calibration panel 108 comprising a confronting surface area 109 that is essentially maximally viewed by the array of heat sensing cameras 420. The heat calibration panel 108 is disposed at a stable distance 112 away from the array 420. The arrangement further including an object cover 161 configured to cover a portion of an ambulatory heat producing object 160, such as a person. The object cover 161 when in a first location is interposed between the array of heat sensing cameras 420 and the heat calibration panel 108 and when the object cover 161 is in a second location, it is not in the field-of-view 106. A microprocessor 116 is configured to execute a calibration routine 117 that uses the heat calibration panel 108 as a calibration baseline for each of the array of heat sensing cameras 420 when a predetermined condition is met, the calibration routine 117 is never executed when the object cover 161 is in the first location.

The above sample embodiments should not be considered limiting to the scope of the invention whatsoever because many more embodiments and variations of embodiments are easily conceived within the teachings, scope and spirit of the instant specification.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though an integrated light source 148 is depicted with the camera system 118, it could just as easily be external as can be the display 130 or other elements shown on or within the camera system 118 without departing from the scope and spirit of the present invention. Another example is the antenna 124, horn 125 and MMW detector 129 could include more or less elements to accommodate advancements in the art while still maintaining substantially the same functionality without departing from the scope and spirit of the present invention. Further, the term "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A camera calibration arrangement comprising:
   a heat sensing camera having a field-of-view;
   a heat calibration panel that is maintained at a constant temperature,
   the heat calibration panel in the field-of-view,
   the heat calibration panel at a set distance from the heat sensing camera;
   an object cover covering a portion of a heat producing object, wherein the object cover is interposed between the heat sensing camera and the heat calibration panel; and
   a microprocessor that executes a calibration routine configured to set a calibration baseline via the heat calibration panel when a predetermined condition is met, the calibration routine is never executed when the object cover is interposed between the heat sensing camera and the heat calibration panel.

2. The single camera calibration arrangement of claim 1, wherein the set distance is at least 5 feet away from the camera.

3. The single camera calibration arrangement of claim 1, wherein the heat calibration panel is mounted on a wall.

4. The single camera calibration arrangement of claim 1, wherein the set distance does not change.

5. The single camera calibration arrangement of claim 1 further comprising a heat image routine that is configured to obtain a heat signature of the heat producing object via the heat sensing camera.

6. The single camera calibration arrangement of claim 1, wherein the heat calibration panel comprises a surface area viewable to the heat sensing camera that is greater than 2 feet squared.

7. The single camera calibration arrangement of claim 1, wherein the heat sensing camera is a millimeter wavelength camera.

8. The single camera calibration arrangement of claim 1, wherein the heat sensing camera senses infrared and/or emissivity.

9. The single camera calibration arrangement of claim 1, wherein the predetermined condition is met after the object cover crosses between the heat sensing camera and the heat calibration panel either after a predetermined amount of time, during a predetermined time schedule, manually activated either remotely or locally, or randomly activated.

10. The single camera calibration arrangement of claim 1, wherein the heat sensing camera is configured to sense at least one metallic object behind the object cover.

11. The single camera calibration arrangement of claim 10, wherein the metallic object is a weapon.

12. A camera calibration method comprising:
providing an MMW camera disposed at a fixed distance from a calibration panel, the panel residing in a field-of-view of the MMW camera;
maintaining the panel at a constant temperature;
triggering a calibration routine for the MMW camera operating on a processor in communication with the MMW camera;
after the triggering step, obtaining an energy emission measurement of energy emission of the panel via the MMW camera only when there is nothing but air in the field-of-view between the MMW camera and the calibration panel;
after the obtaining step, calibrating the MMW camera by adjusting an energy emission measurement level for the MMW camera to match the energy emission;
after the adjusting step, the MMW camera acquiring a metal object signature from a metal object that is on a person's body, the metal object is between the person's body and the MMW camera, the metal object is covered under clothing that covers at least a portion of the person's body;
visually displaying the metal object signature on a display screen linked to the MMW camera.

13. The camera calibration method of claim 12, wherein the fixed distance is between 5 feet and 20 feet.

14. The camera calibration method of claim 12, wherein the calibration panel is mounted on a wall and the MMW camera is affixed to a stand.

15. The camera calibration method of claim 12, wherein the obtaining step happens between when a second person's body is interposed between the MMW camera and the calibration panel and the person's body is interposed between the MMW camera and the calibration panel, the triggering step occurs as a result of the person's body passing in between the MMW camera and the calibration panel.

16. The camera calibration method of claim 15 further comprising collecting a second energy emission measurement of a second energy emission of the person's body after the obtaining step when the person's body is in the field-of-view.

17. The camera calibration method of claim 15 wherein the triggering step occurs after a predetermined amount of time has lapsed.

18. The camera calibration method of claim 15 further comprising an infrared (IR) camera linked with the MMW camera, the IR camera collecting IR radiation from the panel, calibrating the IR camera from the IR radiation, collecting a heat signature of at least a portion of the person's body when in the field-of-view, the IR camera sharing an overlapping IR field-of-view with the field-of-view.

19. The camera calibration method of claim 15 further comprising an optical camera linked with the MMW camera, the MMW camera collecting and optical image of the person's body and superimposing an image of the person's body with the metal object signature on a display screen.

20. An MMW wave sensing camera calibration arrangement comprising:
an MMW camera disposed at a set distance from an energy emission calibration panel, a front face of the energy emission calibration panel is in a field-of-view of the MMW camera;
the calibration panel is at a constant temperature;
a microprocessor and at least one non-transient computer memory linked to the MMW camera, wherein the at least one non-transient computer memory comprises a baseline emissivity value corresponding to the energy emission calibration panel;
the at least one non-transient computer memory containing a calibration routine that is configured to reset the baseline only when no object comes between the energy emission calibration panel and the MMW camera in the field-of-view;
a visual display linked to the MMW camera configured to display an MMW signature of a metal object carried on a person's body when the person's body is in the field-of-view, the metal object concealed by clothing worn over the person's body.

* * * * *